United States Patent
Lauter et al.

(10) Patent No.: US 8,837,718 B2
(45) Date of Patent: Sep. 16, 2014

(54) USER-SPECIFIED SHARING OF DATA VIA POLICY AND/OR INFERENCE FROM A HIERARCHICAL CRYPTOGRAPHIC STORE

(75) Inventors: Kristin Estella Lauter, Redmond, WA (US); Mihir Bellare, San Diego, CA (US); Josh Benaloh, Redmond, WA (US); Melissa E. Chase, Kirkland, WA (US); Erik J. Horvitz, Kirkland, WA (US); Chris Demetrios Karkanias, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 12/413,445

(22) Filed: Mar. 27, 2009

(65) Prior Publication Data

US 2010/0246827 A1  Sep. 30, 2010

(51) Int. Cl.
*H04L 9/14* (2006.01)
*H04L 9/30* (2006.01)
*G06F 21/62* (2013.01)
*H04L 9/08* (2006.01)

(52) U.S. Cl.
CPC ........... *H04L 9/3073* (2013.01); *H04L 2209/88* (2013.01); *G06F 21/6209* (2013.01); *H04L 9/0836* (2013.01)
USPC ............... 380/45; 713/177; 713/157; 726/1; 380/44; 380/278

(58) Field of Classification Search
CPC . G06F 21/6209; H04L 9/0836; H04L 9/3073; H04L 2209/88
USPC ............ 713/157, 177; 380/45, 44, 278; 726/1
See application file for complete search history.

(56) References Cited

U.S. PATENT DOCUMENTS

| 6,424,996 | B1 * | 7/2002 | Killcommons et al. | 709/206 |
| 6,886,096 | B2 * | 4/2005 | Appenzeller et al. | 713/170 |
| 7,003,117 | B2 * | 2/2006 | Kacker et al. | 380/277 |
| 7,017,181 | B2 * | 3/2006 | Spies et al. | 726/3 |
| 7,103,911 | B2 * | 9/2006 | Spies et al. | 726/3 |
| 7,113,594 | B2 * | 9/2006 | Boneh et al. | 380/28 |

(Continued)

OTHER PUBLICATIONS

Urs Hengartner, Peter Steenkiste, "Exploiting Hierarchical Identity Based Encryption for Access Control to Pervasive Computing Information", Sep. 2005.*

(Continued)

*Primary Examiner* — Jung Kim
*Assistant Examiner* — Thomas Ho
(74) *Attorney, Agent, or Firm* — Dan Choi; Judy Yee; Micky Minhas

(57) ABSTRACT

The claimed subject matter relates to architectures that can construct a hierarchical set of decryption keys for facilitating user-controlled encrypted data storage with diverse accessibility and hosting of that encrypted data. In particular, a root key can be employed to derive a hierarchical set of decryption keys and a corresponding hierarchical set of encryption keys. Each key derived can conform to a hierarchy associated with encrypted data of the user, and the decryption capabilities of the decryption keys can be configured based upon a location or assignment of the decryption key within the hierarchy. The cryptographic methods can be joined with a policy language that specifies sets of keys for capturing preferences about patterns of sharing. These policies about sharing can themselves require keys for access and the policies can provide additional keys for other aspects of policy and or base-level accesses.

20 Claims, 12 Drawing Sheets

(56) References Cited

U.S. PATENT DOCUMENTS

| | | | |
|---|---|---|---|
| 7,127,613 | B2 | 10/2006 | Pabla et al. |
| 7,336,784 | B2 | 2/2008 | Zuili |
| 7,337,322 | B2 * | 2/2008 | Gentry et al. ................. 713/176 |
| 7,370,202 | B2 * | 5/2008 | Appenzeller et al. ......... 713/171 |
| 7,565,683 | B1 * | 7/2009 | Huang et al. ....................... 726/1 |
| 7,974,924 | B2 * | 7/2011 | Holla et al. ..................... 705/51 |
| 2002/0031230 | A1 | 3/2002 | Sweet et al. |
| 2004/0199782 | A1 | 10/2004 | Arnold |
| 2005/0027723 | A1 | 2/2005 | Jones et al. |
| 2005/0060561 | A1 | 3/2005 | Pearson et al. |
| 2005/0060568 | A1 | 3/2005 | Beresnevichiene et al. |
| 2005/0076233 | A1 | 4/2005 | Aarts et al. |
| 2005/0251865 | A1 | 11/2005 | Mont et al. |

OTHER PUBLICATIONS

Dan Boneh, Xavier Boyen and Eu-Jin Goh, "Hierarchical Idenitty Based Encryption with Constant Size Ciphertext", May 20, 2005, Advances in Cryptology—EUROCRYPT 2005, vol. 3493, pp. 440-456.*

Craig Gentry, Alice Silverberg, "Hierarchical ID-based Cryptography", ASIACRYPT 2002, pp. 548-566.*

Ran Caneti, Shai Halevi, Jonathan Katz, "A Forward-Secure Public-Key Encryption Scheme", Dec. 23, 2003, pp. 255-271.*

Dan Boneh, Giovanni Di Crescenzo, Rafail Ostrovsky, Giuseppe Persiano, "Public Key Encryption with Keyword Search", Jan. 1 2004, pp. 506-522.*

Michel Abdalla, Mihir Bellare, Dario Catalano, Eike Kiltz, Tadayoshi Kohno, Tanja Lange, John Malone, "Searchable Encryption Revisited: Consistency Properties, Relation to Anonymous IBE, and Extensions," Feb. 2007, pp. 205-222.*

Michel Abdalla, Dario Catalano, Alexander W. Dent, John Malone-Lee, Gregory Neven, Nigel P. Smart, "Identity-Based Encryption Gone Wild", Dec. 9, 2006.*

Walid Bagga, Refik Molva, "Policy-Based Cryptography and Applications," 2005, Proceedings of the 9th International Conference on Financial Cryptography and Data Security.*

Siani Pearson, et al. Securing Information Transfer in Distributed Computing Environments http://ieeexplore.ieee.org/iel5/8013/4446683/04446695.pdf?isnumber=4446683&arnumber=4446695. Last accessed Apr. 30, 2008, 9 pages.

Nezhad, et al. Web Services Interoperability Specifications. 0018-9162/06 IEEE http://ieeexplore.ieee.org/iel5/2/34216/01631936.pdf?tp=&arnumber=1631936&isnumber=34216. Last accessed Apr. 30, 2008, 9 pages.

M. Hondo, et al. Securing Web services. IBM Systems Journal, vol. 41, No. 2, 2002, New Developments in Web Services and Ecommerce https://www.research.ibm.com/journal/sj/412/hondo.html. Last accessed Apr. 30, 2008, 11 pages.

* cited by examiner

USER-SPECIFIED SHARING OF DATA VIA POLICY AND/OR INFERENCE FROM A HIERARCHICAL CRYPTOGRAPHIC STORE

BACKGROUND

Since the launch of the computer revolution decades ago, data has been steadily migrated or been duplicated to exist in electronic or digital form. Today, a very significant portion of personal or other information about many individuals or other entities exists in this form, and those individuals or entities have come to rely on the utility and convenience of computer-based data storage, since these data stores can be accessed by way of computer networks. However, the domain of data storage is often plagued by conflicting interests such as privacy versus accessibility.

In the domain of medical or health record storage, these conflicting interests are especially apparent. For example, many individuals are quite adverse to personal health-oriented data from being discovered by unauthorized or unanticipated third parties. At the same, these individuals generally desire the ability to conveniently share this data with a personal physician or other trusted parties, such as scientists who wish to perform research that might benefit others. As a result, current network-accessible medical database are structured such that a server controls all access to the data, which introduces a number of difficulties. First, the server has full access to the data because either the data is not encrypted or by virtue of control of the decryption keys, which raises concerns for the individuals with data hosted on the server.

Second, granting access to one's medical records is typically an all-or-nothing proposition due to the conflicting issues. Thus, even though the individual might want an authorized party to see some information but not other information, the individual has very little control. For example, the individual might want her dentist to only see a smaller amount or a subset of data that is visible to her personal physician. Furthermore, such databases can be a rich source of medical research, which might even be encouraged or approved by the individual, but again the individual has very little control of what information another entity can see about her if she grants access.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises architectures that can construct a hierarchical set of decryption keys for facilitating user-controlled encrypted data storage with diverse accessibility and hosting of that encrypted data. In accordance therewith and to other related ends, an architecture can obtain a root key or construct the root key based upon information (e.g., password or other data) provided by a user.

The root key can be employed to derive a private set of decryption keys, each of which conform to a hierarchy associated with encrypted data of the user. Moreover, each decryption key can be endowed with encryption capabilities that are based upon or defined or described by the hierarchy. For example, a particular decryption key's location or assignment within the hierarchy can determine the encrypted data associated with the user that can be decrypted by that decryption key. Accordingly, a decryption key that exists in the hierarchy as a parent of a second decryption key can be configured to decrypt a particular portion of the encrypted data, while the child can be configured to decrypt a subset of that portion of encrypted data.

Hence, each decryption key can pertain to a different set of data that can be decrypted and can further be distributed by the user such that the user can maintain granular control over which parties can access his or her information, rather than being forced to rely upon the discretion of the server or the managing entity that hosts the encrypted data for the access-control. Moreover, since the user manages these aspects, the server need not have any access to unencrypted data, which would otherwise be the case if the server was controlling the policy of what information should or should not be provided to a particular entity.

Moreover, in addition to controlling access to data by key distribution, the user can further leverage the hierarchy (or a language feature or grammar related thereto) to provide a robust policy defining various patterns of access associated with the hierarchy or the decryption keys. Thus, the architecture can further employ the policy when deriving decryption keys from the root key. Accordingly, the user can utilize the policy to further detail various factors relating access or even access to the policy or portions of the hierarchy.

Moreover, even though the server need not be privy to unencrypted data, the server can host the encrypted data in a manner that is searchable (e.g., by researchers or the like) by way of a variety of mechanisms or techniques such as keyword search based cryptographic techniques or searchable symmetric key cryptographic techniques. Moreover, the user can further tailor what data or in what form that data is provided to authorized accessing parties. For example, in the case of deterministic keys, the user can provide a ciphertext of plaintext data (e.g., name, address) with instructions to the server not to disseminate matching data. Thus, even though the server need not be aware of the contents of the plaintext, the user can still share her data with a researcher in an anonymous way. Appreciably, the ciphertext could also describe the information that can be shared with the researcher instead.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
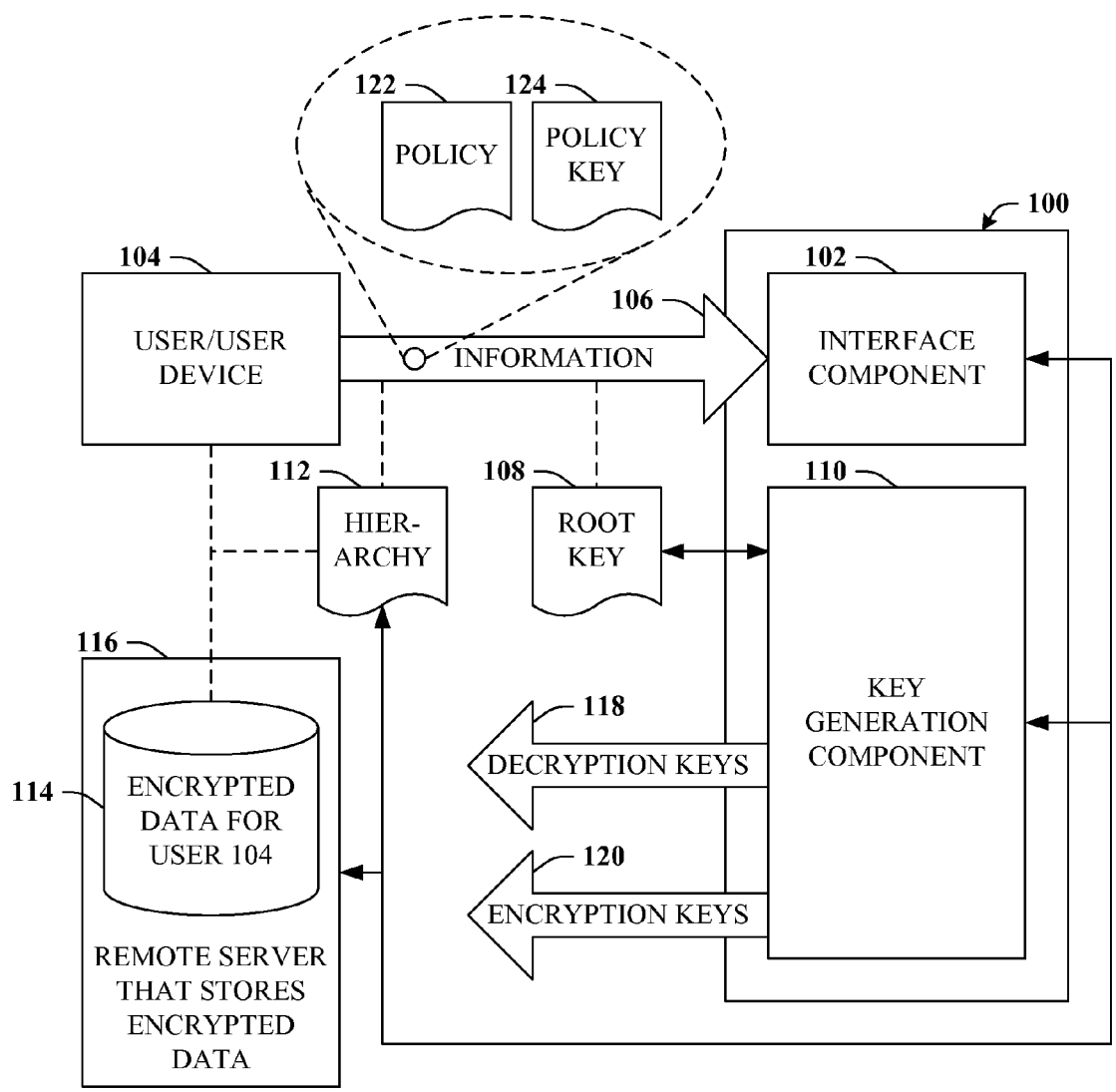
FIG. 1 illustrates a block diagram of a computer-implemented system that can create a hierarchical set of decryption keys in order to facilitate user-controlled encrypted data storage with diverse accessibility.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Moreover, inferential processes can also lead to the generation and output of policies and associated actions, such as rules and actions (e.g., the availability of specific sets of keys) for sharing, based on a consideration of a user's assessed preferences as captured in a utility model that represents preferences about sharing. Expected-utility-centric inference can be used to identify such sharing actions with the highest expected utility. Such policies can be extended with such general preferences on policy that would require, specific patterns of confirmation based on the type of the data being shared. For example, a user might assert, when relying on a generally-specified utility model that captures his or her preferences about sharing, that when inference led to the sharing of information of the form that had not been shared in the past, the system should first seek confirmation from the user, and for the system to note the response in future inferences about sharing Referring now to the drawings, with reference initially to FIG. 1, computer-implemented system 100 that can create a hierarchical set of decryption keys in order to facilitate user-controlled encrypted data storage with diverse accessibility is depicted. Generally, system 100 can include interface component 102 that can obtain from user 104 (or, by proxy, from an associated device of user 104) information 106 associated with a cryptographic root key 108. For example, interface component 102 can provide fields or other means suitable for user 104 to input information 106. Moreover, interface component 102 can include or be operatively coupled to various I/O devices to enable the transmission of information 106 such as a keyboard, a universal serial bus (USB), a fingerprint reader or another biometric sensor and so on. In addition, interface component 102 as well as other components described herein can include a network adapter such that data can be received or transmitted over a network, such as the Internet.

It should be appreciated and understood that information 106 can include other data in addition to that which is associated with root key 108, which is further detailed infra. However, information 106 will typically at least include data pertaining to root key 108. By way of illustration, information 106 can include root key 108, e.g., stored on a USB drive, a fob, a bracelet, or another device of user 104. Alternatively, information 106 can include a password, e.g., input by user 104. In the latter case, key generation component 110 can construct root key 108 based upon information 106, such as the password or employ biometric data to access the password or root key 108. While the claimed subject matter can be applicable to a wide variety of privacy-centric data storage or access techniques, such techniques can be particularly useful for health or medical data. Accordingly, many of the examples employed herein relate specifically to health or medical records associated with user 104, but it should be appreciated that the claimed subject matter can apply to other domains as well. Furthermore, it should further be appreciated that the terms "access," "accessibility," or the like in connection with encrypted data 114 is sometimes intended to mean access to the original or unencrypted version of that data. In other words, the ability to obtain encrypted data does not necessarily constitute "access" without the capability to decrypt that encrypted data.

Regardless of whether root key 108 is received by interface component 102 or created based upon information 106 received by interface component 102, key generation component 110 can employ root key 108 to derive private set 118 of cryptographic decryption keys. As used herein, the decryption keys included in private set 118 are referred to either collectively or individually as decryption keys 118, with suitable subscripts employed when necessary or helpful in the description to distinguish between members of private set 118. In one or more aspect of the claimed subject matter, all or a portion of decryption keys 118 that are derived from root key 108 can conform to hierarchy 112, which can, inter alia, be associated with encrypted data 114 of user 104.

In particular, hierarchy 112 can describe partitions or partitioning of encrypted data 114, and can do so based upon features or content of the encrypted data 114. For example, hierarchy 112 can describe partitioning based upon sensitivity of all or a portion of encrypted data 114 (e.g., a particular medical record) or based upon a particular discipline or category or type of the medical record or based upon one or more health provider organizations. Moreover, respective decryption capabilities for each decryption key 118 can be defined based upon a location or an arrangement of that decryption key 118 within hierarchy 112. For example, a hierarchical assignment of a given decryption key 118 can determine how much as well as which types or portions of encrypted data 114 that can be decrypted by that decryption key 118, which is further detailed with reference to FIG. 2.

Figure 2:
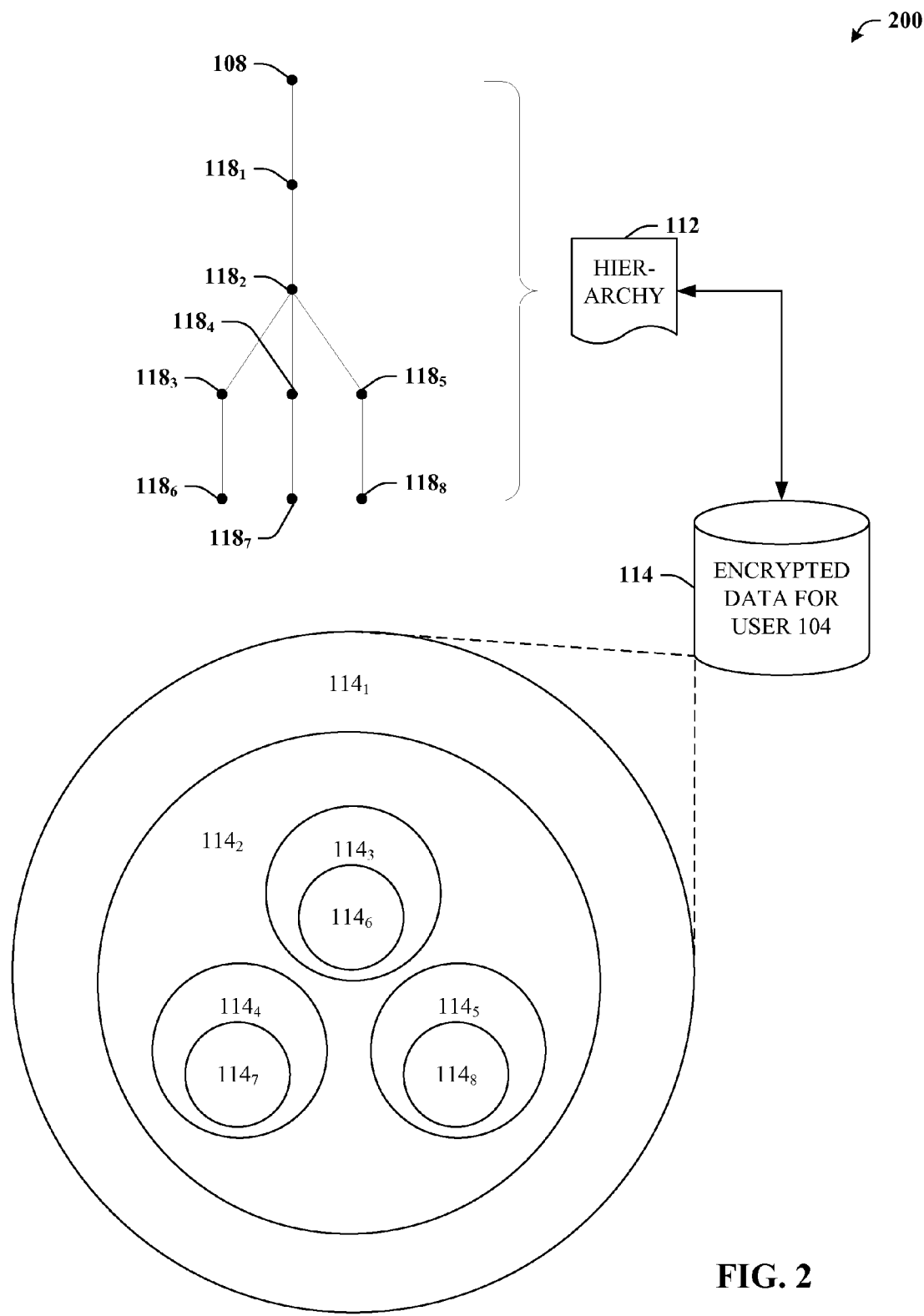
FIG. 2 provides illustration 200 that depicts various graphical representations of hierarchy 112.

While still referring to FIG. 1, but turning now also to FIG. 2, illustration 200 is provided that depicts various graphical representations of hierarchy 112. In the upper portion of illustration 200, a tree-type structure is provided with root key 108 at the top of the tree. It should be appreciated that a tree structure is merely exemplary and other structures or topologies are suitable for use in connection with the claimed subject matter. In one or more aspect, key generation component 110 can employ hierarchy 112 to characterize a first decryption key (denoted $118_1$) as a parent and a second decryption key (denoted $118_2$) as a child of that parent. Such parent-child relationship is readily apparent from illustration 200, as is the fact that decryption key $118_2$, while a child of key $118_1$, is a parent of key $118_4$. In fact, according to the illustrated hierarch 112, decryption keys $118_3$-$118_8$ are all children of decryption keys $118_1$ and $118_2$.

Accordingly, after characterizing any or all of the parent-child relationships between various description keys included in private set 118, key generation component 110 can configure the parent (e.g., decryption key $118_1$) to decrypt a first set or portion of encrypted data 114 associated with user 104, while configuring the child (e.g., decryption key $118_2$) to decrypt a second set or portion of encrypted data 114, wherein the first and second sets of encrypted data 114 are not the same. In particular, the second set of encrypted data (e.g., the portions that can be decrypted by the child key) can be a subset of the first set of encrypted data (e.g., the portions that can be decrypted by the parent key).

These features are visually represented by the example Venn diagram that is provided at the lower half of illustration 200, in which each decryption key 118 in the tree representation of hierarchy 112 can correspond to a portion of encrypted data 114 that can be decrypted by that decryption key 118. Thus, since decryption key $118_2$ is the child of decryption key $118_1$, decryption key $118_2$ can be configured to decrypt a lesser amount of encrypted data $114_2$, and that lesser amount can be a subset of encrypted data $114_1$, which is illustrated by corresponding areas $114_1$ and $114_2$, respectively. Accordingly, based substantially on authorization from user 104 or settings or preferences associated therewith, interface component 102 can transmit the parent (e.g., decryption key $118_1$) to a first disparate entity and further transmit the child (e.g., decryption key $118_2$) to a second disparate entity. Hence, the second disparate entity will be able to decrypt only a portion of the data decryptable by the first disparate entity.

To provide a concrete illustration of the above-mentioned features, consider the case in which encrypted data 114 relates to health or medical information associated with user 104 that is securely stored for the user by remote server 116. Suppose further that a large portion of encrypted data 114 has been indexed or classified consistent with hierarch 112 as "Basic Health Information," whereas a subset of that data has been indexed or classified as "Allergy Information." Thus, Allergy Information stored by remote server 116 can be a hierarchical child of Basic Health Information, and thus can be representative of, say, reference numeral $114_6$ in the Venn diagram, with Basic Health Information representative of reference numeral $114_3$. Likewise, corresponding decryption keys $118_3$ and $118_6$, respectively, can be utilized to decrypt these two sets of data. Continuing this example, user 104 can distribute decryption key $118_3$ (which can decrypt Basic Health Information) to his or her family physician, yet provide decryption key $118_6$ (which can decrypt only a subset of Basic Health Information, in particular only Allergy Information) to his or her dentist. Equipped with the suitable decryption keys 118, the physician and the dentist can retrieve appropriate information pertaining to user 104 from remote server 116, and then decrypt that information.

In addition, as is apparent from the tree structure, decryption keys $118_3$-$118_5$ are peer keys (and each has a child in decryption keys 118₆-118₈, respectively). Sometimes, and in this example, as can be readily seen by examination of corresponding areas 114₃-114₅ of the Venn diagram, peer keys can be mutually exclusive in the data each is configured to decrypt. However, this need not always be the case. For example, peer keys can be configured to decrypt overlapping portions of encrypted data 114, which can be a result of duplicate data in different portions, sections, or categories of a data store that houses encrypted data 114; due to indexing, references, or annotation; or by virtue of the fact that certain data might be important or relevant for many categories or classification upon which hierarchy 112 is based, even if such categories do not have a direct or indirect parent-child relationship.

Continuing to refer to FIG. 1, in one or more aspects of the claimed subject matter, key generation component 110 can further construct one or more encryption key 120. Encryption key 120 can operate as a counterpart to an associated decryption key 118. Accordingly, encryption key 1120 can be configured to encrypt data associated with user 104 (e.g., to produce encrypted data 114) in a manner that is decryptable by at least one decryption key included in private set 118 of cryptographic decryption keys. Hence, as with its decryption key 118 counterpart, encryption key 120 can be configured to encrypt data associated with user 104 according to hierarchy 112 such that only a corresponding decryption key 118 or a parent thereof can decrypt associated encrypted data 114.

However, unlike the associated decryption key 118, encryption key 120, in one or more aspects, can be (but need not be) public or publicly available rather than private or secret. In fact, not only can encryption key 120 vary as to whether or not it is public, encryption key 120 can be based upon a variety of suitable technologies, protocols, or architectures, many of which are further detailed herein. Appreciably, several aspects or embodiments described herein in connection with encryption keys 120 configurations can be applicable to configurations of associated decryption keys 118. For example, as introduced briefly above, encryption key 120 can conform to public-key cryptography protocols that typically employ a public-private key pair. In this case, encryption key 120 can be one of a public set of cryptographic encryption keys, wherein each public encryption key included in the public set of encryption keys can correspond to a respective decryption key included in the private set 118 of decryption keys.

Hence, referring briefly once more to FIG. 2, the tree structure diagram of hierarchy 112 that applies to decryption keys 118₁-118₈ can be substantially identical to that for a set of associated encryption keys 120₁-120₈ (not shown). Likewise, the Venn diagram can be similarly substantially identical if used to illustrate data that can be encrypted by a particular encryption key 120 rather than encrypted data 114 that can be decrypted by a particular decryption key 118.

While much of the discussion thus far has been directed to the ability to decrypt encrypted data 114 that is associated with user 104 (e.g., user 104 can selectively distribute private decryption keys 118 to trusted third parties or entities, providing those trusted entities with the capability to access and/or decrypt certain portions of encrypted data 114), a reciprocal question arises as to which entities have the capabilities to encrypt and/or add to data associated with user 104, which can be based upon the configuration of keys 118, 120. Appreciably, the claimed subject matter can provide for numerous and potentially diverse means of providing for these features.

Drawing from the previous example scenario, in one or more aspects, both the family physician (who received a parent decryption key 118) and the dentist (who received only a child decryption key 118) can encrypt data associated with user 104, since the two disparate entities can derive an associated encryption key 120 from the decryption key 118 each was given by user 104. However, consider the situation in which the family physician transmits X-ray data associated with user 104 to a clinic or lab for evaluation by a specialist. In that case, it can be very beneficial for the clinic or lab to update encrypted data 114 with the results even though the clinic does not have access or authorization to any private decryption keys 118.

In the case of public-key cryptography, in one or more aspects, user 104 can publish a public encryption key 120 to, e.g., remote server 116 that maintains encrypted data 114 for user 104. The lab or clinic can thus access remote server 116 to download appropriate encryption key(s) 120 and use those encryption key(s) 120 to encrypt relevant data relating to examination of the X-rays, and then upload the encrypted data 114 to server 116. Typically, when employing public-key cryptography, hierarchy 112 can be established in advance and a separate encryption key 120 can be generated for each category, subcategory, or classification defined by hierarchy 112. However, if deemed to be necessary or desired, new categories can be readily added afterwards. For example, suppose that in the future DNA information becomes standard data for general medical treatment and user 104 will often desire to share all or specific subsets of single nucleotide polymorphisms (SNPs) with practitioners or researchers. In that case, user 104 (or another authorized entity such as key generation component 110 or another component) can at some point create a new category, say, "DNA Information." DNA Information can be a subcategory of Basic Health Information, and the associated key or keys produced in connection with the DNA Information category can be a child of Basic Health Information for hierarchy 112.

Furthermore, in one or more aspects of the claimed subject matter, hierarchical identity-based cryptography can be employed rather than the public-key cryptography explained in the above example. Identity-based encryption can enable a disparate entity to choose substantially any string as an identity parameter when encrypting data associated with user 104. This identity parameter can represent a category or classification that is included in or described by hierarchy 112. For example, consider again the above example. In this case suppose a medic desires to store or upload data associated with user 104, but has not been given any decryption keys 118. In particular, the medic desires to upload data relating to a blood test for user 104. The medic (or another entity or component) can choose one or more attributes or identity parameters associated with the data such as the string "Blood Test" or the current date. The suitable encryption key 120 can be obtained from remote server 116 in a manner that is identical or substantially similar to that described supra, and then the medic can employ encryption key 120 to encrypt the results of the blood test along with the selected identity parameters. Appreciably, user 104 can control to whom to distribute corresponding decryption keys 118 that enable decryption of this data. Thus, hierarchical identity-based cryptography allows user 104 to provide decryption keys 118 for top-level categories (e.g., Basic Health Information) or for more specific lower-level subcategories, such as for Blood Test or Allergy Information.

It should be appreciated that with either of the two approaches noted above, either with hierarchical public key cryptography or with hierarchical identity-based cryptography, symmetric key techniques can be employed. In particular, encryption key 120 can be identical or trivially related to a corresponding decryption key 118. One benefit of symmetric keys is that encryption of encrypted data 114 can be more efficient. However, when configuring keys 118, 120 as symmetric keys, it should be appreciated that user 104 will typically not publish encryption key 120. Thus, in order for the medic to encrypt and/or update information associated with user 104, the medic must have access to a private key similar to what was provided to the family physician or dentist in the first example above.

In accordance therewith, it is readily apparent that the claimed subject matter can meet current needs of allowing data associated with user 104 to be cryptographically stored such that unencrypted data cannot be accessed (and in some cases no information at all can be adversarially derived) by any unauthorized third party or entity, potentially including server 116 or another host. Yet, at the same time, data associated with user 104 can be readily available to substantially any authorized party since server 116 can be (but need not be) publicly accessible, while the ability to decrypt any encrypted data 114 retrieved from server 116 can be limited to only parties who possess the appropriate hierarchical decryption key 118, which is controlled by user 104 rather than server 116. Moreover, authorized third parties or entities (e.g., medical researchers) can also be afforded the ability to construct search queries and be delivered relevant results, even when server 116 does not have the capability to access unencrypted data.

Figure 4:
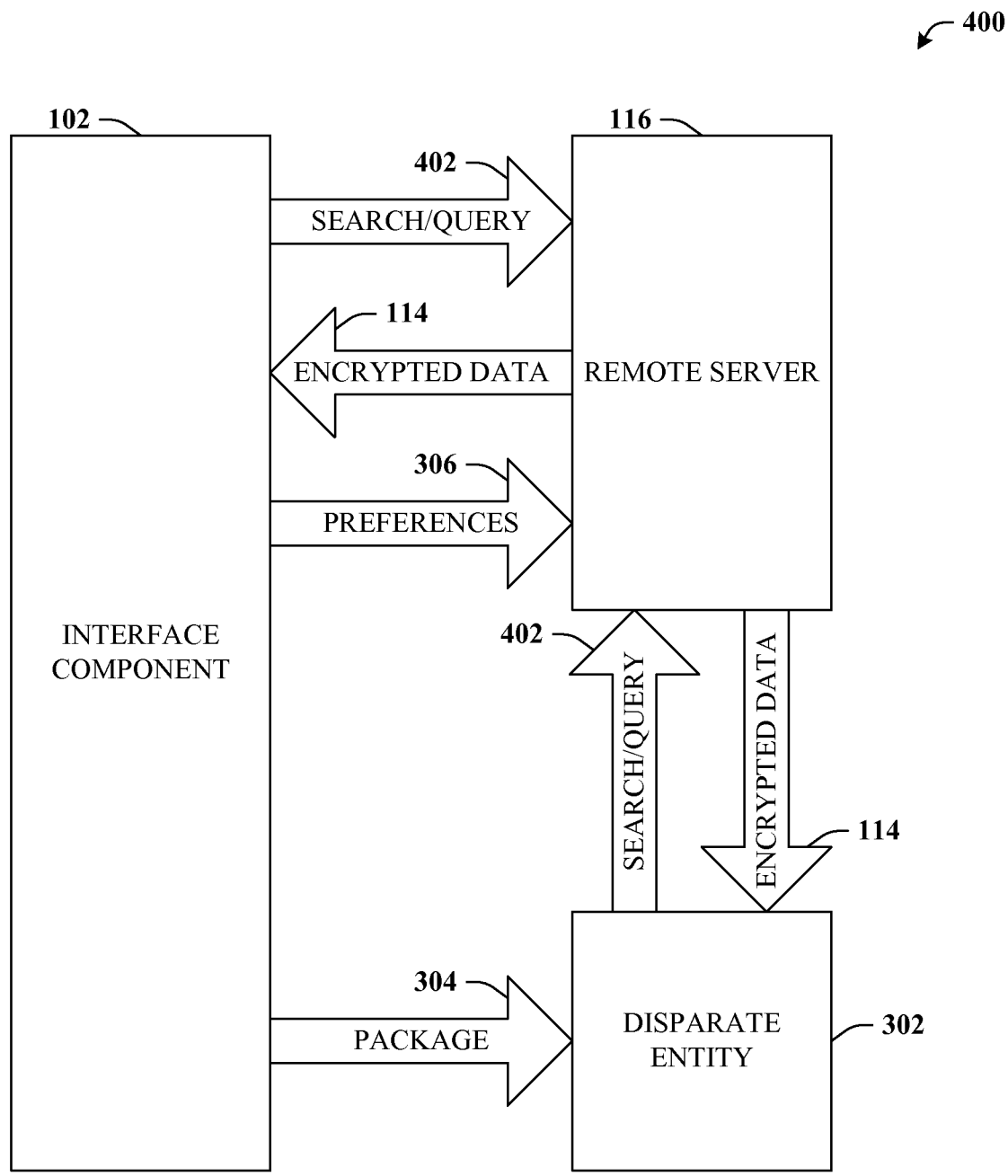
FIG. 4 depicts a block diagram of a system that can facilitate search queries in connection with encrypted data inaccessible to the host in accordance with hierarchical encryption keys.
Figure 5:
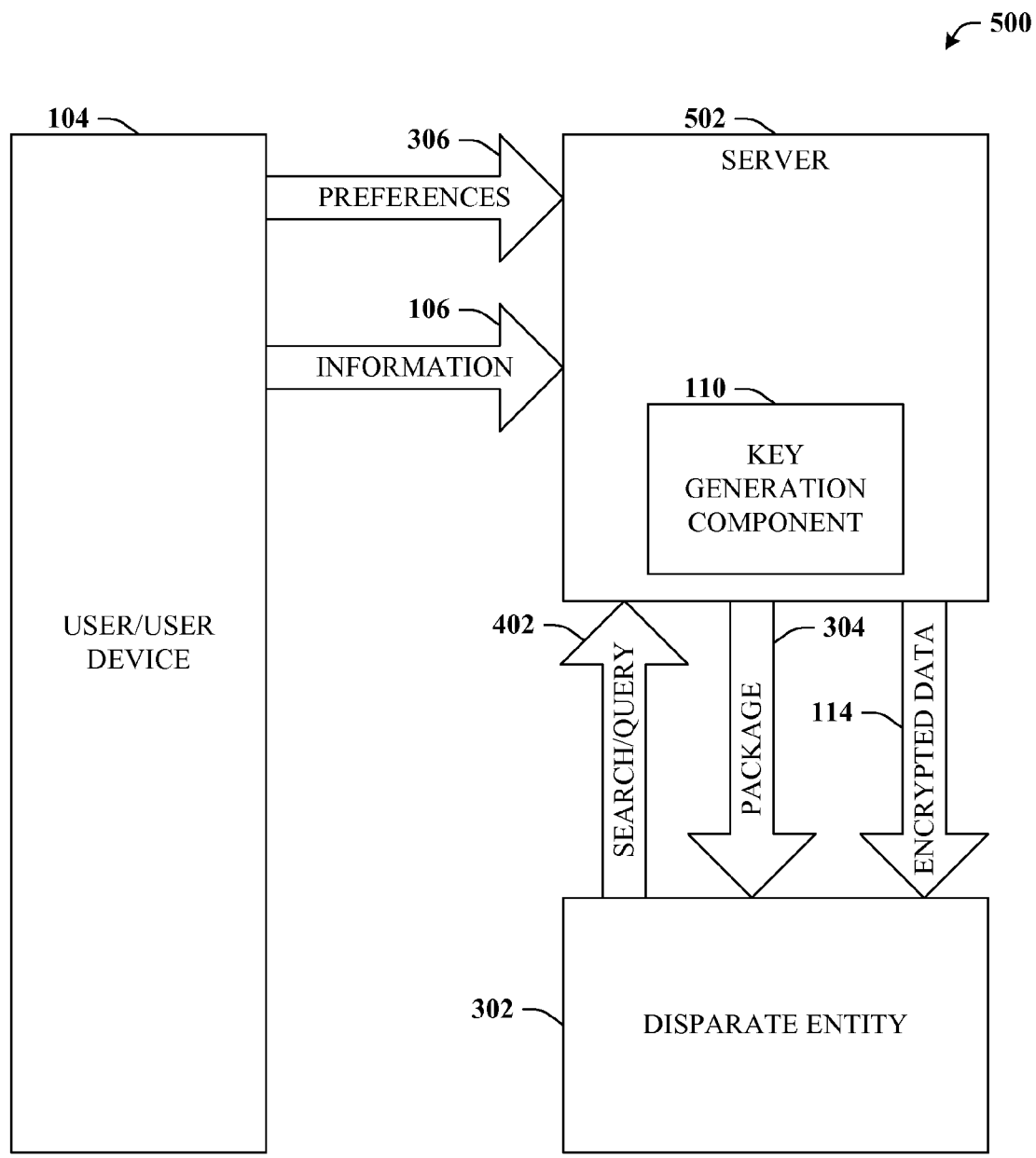
FIG. 5 illustrates a block diagram of a system that can facilitate search queries in connection with encrypted data accessible to the host in accordance with hierarchical encryption keys.

Appreciably, the ultimate configuration or structure relating specifically to how server 116 operates can depend upon the nature of cryptographic keys 118, 120 derived by key generation component 110 as well as depend upon preferences of user 104 or certain market factors. In that vein, FIG. 3 generally illustrates encrypting data and uploading that encrypted data 114 to server 116, but it should be once again called out that the functioning or operation of server 116 (e.g., whether server 116 can access or decrypt some or all encrypted data 114, whether server 116 is publicly accessible or not . . . ) can be determined by the configuration of cryptographic keys 118, 120. On the other hand, FIGS. 4 and 5 illustrate features relating to searching/retrieval of data associated with user 104 from a server-hosted database or data store, with FIG. 4 specifically directed to the case in which the server does not have access to unencrypted data and/or decryption keys 118, and FIG. 5 is specifically directed to the case in which the server can have access to decryption keys 118.

As has been described, it is readily apparent that user 104 can have control over access to associated encrypted data 114 via selectively distributing various keys in accordance with the goals or desires of user 104. Moreover, in addition to controlling access to data by key distribution, user 104 can further leverage hierarchy 112 (or a language feature or grammar related thereto) to provide a robust policy 122 defining various patterns of access associated with the hierarchy 112 or decryption keys 118. In one or more aspects, policy 122 can be included in information 106. Further, given that policy 122 can define a pattern of access associated with hierarchy 112 or a certain key 118, 120, key generation component 110 can employ policy 122 as well as root key 108 to derive all or a portion of keys 118, 120.

In more detail, policy 122 can relate to a wide variety of settings or preferences of user 104. By way of illustration, policy 122 can relate to a statement regarding how a certain key 118, 120 can or should be used, or to an assertion of rules, constraints, or inferences in connection with that certain key 118, 120. In accordance therewith, the pattern of access can relate to various settings, limitations on use, contextual requirements for use or the like. For example, the access pattern can specify or define that the certain key 118, 120 can be used only once (one-time access), or can be limited to a set number of uses or used for a set period of time. Furthermore, the pattern of access can relate to access based upon a contextual situation such as the purpose of or reason for a third party desiring access to encrypted data 114; or relate to access based upon a type, category, or classification of the data or a level of detail or precision for the data; or relate to access based upon an identity of the accessing third party and so one.

Appreciably, hierarchy 112 or sets 118, 120 can embody a language for sharing and control that allows for richer patterns of access based on specification of or definitions for of multiple keys 118, 120. Thus, beyond single keys, sets of keys that capture preferences associated with user 104 relating to the sharing of data 114 that can be stored at different and multiple branches within a hierarchical data structure (potentially along with other people or organizations) may be constructed, stored, and communicated by users 104.

Furthermore, in one or more aspects of the claimed subject matter, a key (e.g., policy key 124) may also be required for accessing some or all of policy 122 or for accessing inferences which can reveal additional keys or sets of keys 118, 120, 124, such as those that refer to sharing actions detailed supra. A hierarchical cryptographic system can also be used for encoding and allowing the sharing or access to aspects of one or more policies 122, potentially including the execution of policies 122, which may be required to make the base-level keys 118, 120 available—thus, allowing access to personal data.

Based upon the above, it is apparent that policy 122 can conform to a sharing policy language that allows users 104 to specify if, how, what, and when to share encrypted data 114. Further, policy 122 can include predicates and objects that allow for the assertion of statements about the sharing of data based on various attributes such as category (e.g., class of disease, physiological system, anatomic region, type of symptom, test results . . . ) and/or based upon various modifiers such as the level of detail and/or precision of shared data 114. Such policies 122 can be designed to work efficiently with hierarchical store 116 and cryptographically keying of personal information. The sharing policy language can also specify higher-level goals that can assume a working verified inferential system.

For instance, user 104 may specify that keys 118, 120 can be shared on a healthcare database that reveal information about a specific subsystem based on Unified Medical Language System (UMLS) definitions. As one example of the above use of policy 122, a constraint can be added that limits the precision of the data 114 when accessed by a particular key 118. As another example, user 104 can specify, that genetic information derived from genomic studies may be shared unless that data indicates a predisposition, based on statistical analyses, that assigns to user 104 some specified lift in risk over the average likelihood of a disorder for a population or cohort population with identical or similar demographical status. For example, genetic information is becoming available over time with ongoing population studies of genetic data. User 104 may therefore wish to specify, as a standing policy, that, e.g., their own single nucleotide polymorphisms (SNPs) data can be shared with practitioners or researchers as part of research projects that can benefit all, as these SNPs become available through testing, unless the SNPs are associated with a lifetime risk of contracting a disorder that is over some threshold of likelihood, over some increase over background or average statistics of risk, or other specification. When such threshold constraints are detected or identified within policy 122, sharing can be disallowed for research purposes and might only be allowed by the user's personal physician for access so as to design ideal proactive test and monitoring practices, as well as behavior-modification recommendations for the user.

Furthermore, in one or more aspects of the claimed subject matter, policy 122 included in information 106 can be encrypted as well such that policy key 124 (which can also be included in information 106) is necessary for accessing policy 122. Thus, in accordance with the above, it should be appreciated that policy 122 can be employed to facilitate revealing of additional layers of hierarchy 112, additional decryption keys 118, or even additional policy keys 124. Thus, it should be understood that policy 122 can provide a specification for handling or revealing one or more arbitrary set of keys as well as the instructions that lead to the revealing of one or more keys in the arbitrary for accessing one or more paths through hierarchical store 116. Moreover, policy 122 can capture, explain, or describe what can be shared or revealed as well as the use of policy 122 for specifying sets of keys 118, 120, 124, which can be based upon, e.g., access to key policy 124, world state, identity, inferences as well as other factors.

Figure 3:
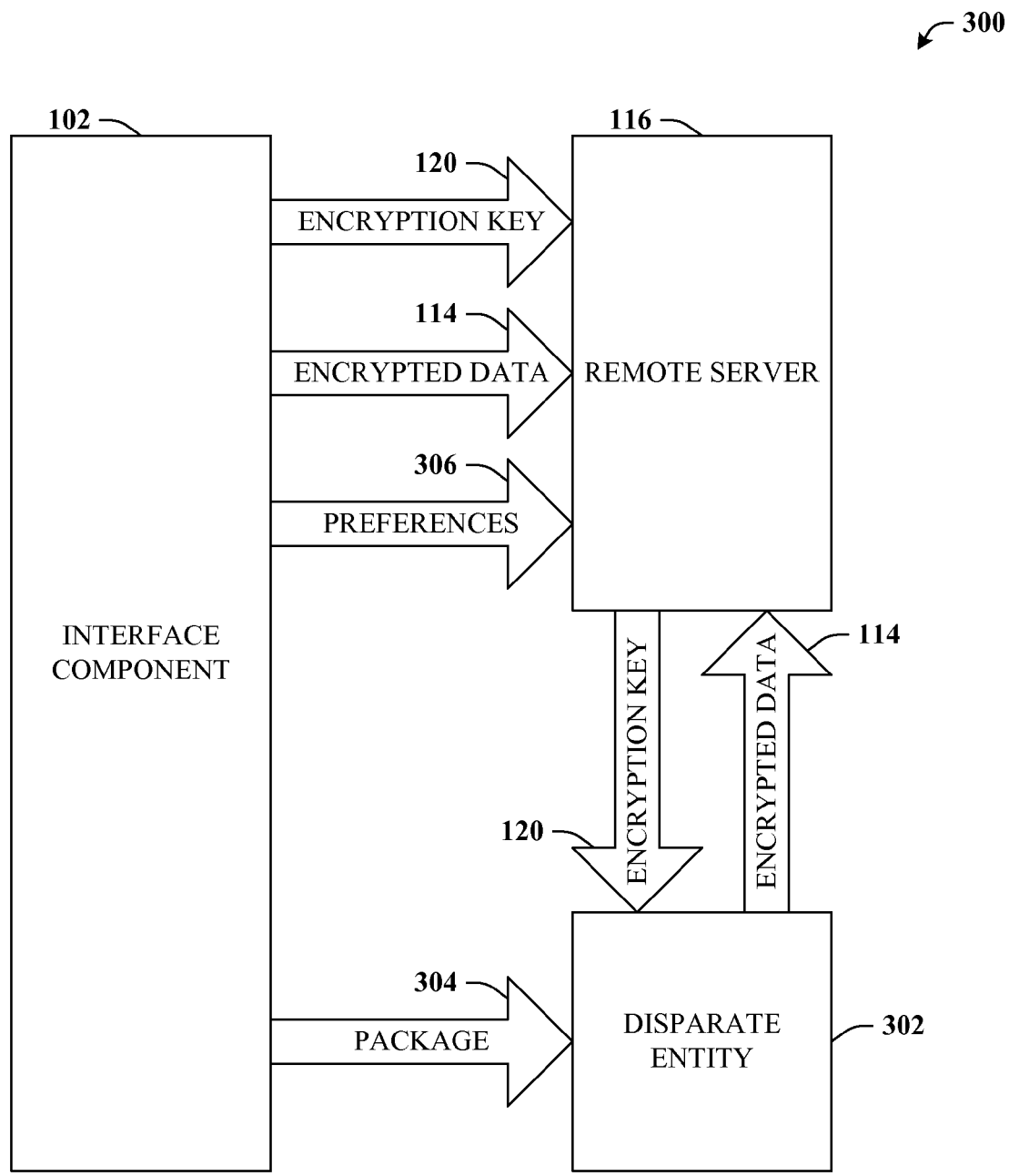
FIG. 3 is a block diagram of a system that can facilitate encryption of data associated with a user and storage of the associated data in accordance with hierarchical encryption keys.

Referring now to FIG. 3, system 300 that can facilitate encryption of data associated with a user and storage of the associated data in accordance with hierarchical encryption keys is provided. System 300 illustrates an architecture in which the components of system 100 can reside in a device such as a personal computer or the like associated with user 104, the family physician, or another trusted disparate entity. System 300 can include interface component 102 that can obtain information 106 that can be associated with root key 108 as substantially described supra. In addition, interface component 102 can provide to remote server 116 one or more encryption keys 118 that can, as depicted, be retrieved by disparate entity 302 in order to allow that disparate entity 302 to encrypt data associated with user 104 and add encrypted data 114 to a record associated with user 104 that is hosted by remote server 116.

Thus, system 300 holistically characterizes who can update data associated with user 104 in one or more aspects of the claimed subject matter. Given that user 104 can be in possession of or quickly derive encryption key 120, user 104 can also transmit encrypted data 114 to remote server 116. In essence, a party (e.g., user 104 or disparate entity 302) with authorization and/or access to remote server 116, and who has or can obtain or derive encryption key 120 can update data relating to user 104. Thus, in the case of public key cryptography or hierarchical identity-based cryptography detailed supra, since encryption key 120 can be hosted on remote server 116, disparate entity 302 can be substantially any party in the general case. For example, the family physician, the dentist, and the medic from previous examples (or even a device such as a network capable blood pressure monitor) can all update data associated with user 104.

However, in accordance with the symmetric key variant, encryption key 120 will typically not be hosted on remote server 116, so disparate entity 302 cannot usually rely on obtaining encryption key 120 from remote server 116. Rather, the suitable key must be explicitly provided by user 104, which can be accomplished by way of package 304. Package 304 is discussed in more detail in connection with FIG. 4, but as a brief introduction, package 304 can include one or more decryption keys 118 and/or one or more encryption keys 120. Thus, transmitting package 304 can be a means for distributing keys to trusted parties such as the family physician as described previously. More particularly, since package 304 can include decryption keys 118, receipt of package 304 can imply that disparate entity 302 can decrypt information associated with user 104. However, in the case of a symmetric key implementation, package 304 can be necessary to allow an update to information associated with user 104.

Moreover, remote server 116 is in many cases envisioned to be publicly accessible to facilitate convenient updates or search or analysis, even by a disparate entity 302 with whom user 104 is not familiar or to whom user 104 has not explicitly distributed package 104 or decryption keys. One example can be, for instance, the medic who updates blood test data as previously discussed with whom user 104 has substantially no contact or familiarity. However, even in the cases in which server 116 is publicly accessible, policies can be maintained to reasonably limit those who can request encryption key 120 and/or update or encrypt data hosted by server 116. For example, transactions with server 116 can require disparate entity 302 to provide credentials (cryptographic or otherwise) before any information can be revealed or accepted. Thus, the medic in a previous example or, say, a medical researcher working for a cure for a particular affliction, can be required to submit suitable credentials before retrieving a key, updating data, or searching (described infra in connection with FIG. 4) encrypted data 114.

Such credentials can be forwarded to user 104 to allow user 104 the option of acquiescing to or denying the requested transaction with respect to his or her data. Additionally or alternatively, the credentials can be verified by server 116 based upon preferences 306 associated with user 104, which is also further discussed with reference to FIG. 4. Moreover, these credentials can be embedded in all updates to encrypted data 114 in order to identify the source of any update as well as logged to track all accesses to server 116 even if no update is provided.

Turning now to FIG. 4, system 400 that can facilitate search queries in connection with encrypted data inaccessible to the host in accordance with hierarchical encryption keys is depicted. In this example, encrypted data 114 can reside on a host server (e.g., server 116) that does not have the ability to access and/or decrypt information associated with user 104. However, the host server can still allow user 104 or his or her family physician or another entity to search or access specific information. Accordingly, it is again noted that implementation of a host server can be dependent on the configuration of hierarchical keys 118, 120.

One approach can be to employ deterministic cryptography for the keys 118, 120. In deterministic encryption, given a particular encryption key 120 and specific plaintext (e.g., unencrypted data), the resultant ciphertext (e.g., the encrypted version of that data) will always be the same. Thus, when a medical researcher, for example, submits a search or query 402, these keywords can be encrypted with encryption key 120 and the resultant ciphertext can be matched to identical instances included in encrypted data 114. In the case in which server 116 does not have access to encryption key 120, disparate entity (e.g., the medical researcher) can transmit the ciphertext (e.g., encrypted by way of encryption key 120 included in package 304) to remote server 116 and thus server 116 is not even aware of the keywords that are being searched, yet can still return results if any matches are found.

However, if disparate entity 302 does not have a suitable encryption key 120, then a request for such can be made in the following exemplary manner. Disparate entity 302 provides credentials (e.g., a public key) that indicate she works for a medical foundation looking for a cure for cancer and would like to user data associated with user 104 for this research. Server 116 forwards the request and credentials to user 104 so that the user decides whether or not this request is acceptable. If so, package 304 can be encrypted with a public key of the researcher such that only the researcher (but not server 116 or another party or disparate entity 302) can decrypt package 304, and return it to server 116 to be forwarded back to researcher.

Naturally, user 104 can control not only who can access her data, but also what data is revealed and also how that data is revealed, which can be accomplished by way of preferences 306. For example user 104 can specify the organizations that uses her data, or specify that her data can only be accessed for research-related purposes. Moreover, user 104 can prevent revelation of data, even to the researcher to whom she granted search privileges. For example, user 104 can decide that a particular researcher or organization can search her data, but only if her personal information (e.g., name, address . . . ) is removed. Even though server 116 might have no way of determining which portion of encrypted data 114 corresponds to name and address, however, user 104 can provide the plaintext of this data to key generation component 110, which can in turn produce ciphertext relating to the restricted information. The resultant ciphertext of name, address, or any other restricted information can be transmitted to server 116 with instruction to prevent any matching ciphertext included in encrypted data 114 from being revealed, even while server 116 is not aware of what that data is or what it particularly relates to. Similarly, a ciphertext of information that is permitted to be revealed can be transmitted to server 116 with instructions indicated that only this data can be revealed to all or certain entities, which can be performed by server 116 even though server 116 need not be aware of what information the ciphertext relates to.

It should be appreciated, however, that deterministic algorithms will typically not be used in connection with public hierarchical keys (either public key or identity-based) since encrypted data 114 might then be more susceptible to dictionary-based adversarial attacks. Rather, deterministic encryption generally would be an option when encryption key 120 is not public or published. In the latter case, dictionary attacks are not an issue, however, an adversary might be able to determine when a ciphertext is repeated, even if not able to determine what the plaintext version of that ciphertext is.

Accordingly, hierarchical keys 118, 120 can be configured to be probabilistic rather than deterministic. More specifically, hierarchical keys 118, 120 can conform to public key encryption with keyword search (PEKS). In PEKS, or another suitable scheme or configuration, encryptions from plaintext to ciphertext are probabilistic or randomized rather than deterministic so that ciphertexts will typically not be the same for the same plaintext. This approach is particularly immune to dictionary attacks and an adversary is not even able to derive when words are repeated. However, researchers (or another disparate entity 302 authorized by user 104) can still search encrypted data 114 by way of a searching "trapdoor." The searching trapdoor can be provided to disparate entity 302 by user 104 by way of package 304. With this approach, uploads to server 116 (e.g., disparate entity 302 adding to the record of user 104) can be very efficient, however; searches are typically linear to the size of the database.

On the other hand, a symmetric key approach (introduced supra) can be employed that can facilitate faster search times (e.g., linear to the number of results rather than to the size of the database), but with updates to the database generally more computationally intensive than for the PEKS scheme. In the symmetric key approach, user 104 (or an authorized entity or agent such as key generation component 110, which can automate the task) can construct an index that records portions of data that include various keywords, potentially by first downloading and decrypting encrypted data 114 that presently resides on server 116. Appreciably, this index can be or can be substantially similar to hierarch 112 in many aspects. This index can be encrypted by with symmetric encryption key 120 and delivered to server 116 substantially as a table of contents for encrypted data 114 stored thereon.

Accordingly, to search for a particular keyword, user 104 can create or authorize a corresponding trapdoor for that keyword, which can be distributed to an authorized disparate entity 302 by way of package 302. A ciphertext for that trapdoor can then be constructed by user 104 or disparate entity 302 and delivered to server 116, which can employ the index and the trapdoor ciphertext to find relevant search results. Updates to encrypted data 114 can be accomplished by retrieving encrypted data 114 that includes the new/updated data and building a new index; or by simply submitting an additional index that relates specifically or only to the new/updated data. In the latter case, updates are less intensive but subsequent search times can be slightly slower (e.g., linear with the number of results and the number of indexes). However, full updates that build a single new index from multiple additional indexes can be performed based upon performance or a routine schedule in order to balance or optimize these sub-approaches.

Referring to FIG. 5, system 500 that can facilitate search queries in connection with encrypted data accessible to the host in accordance with hierarchical encryption keys is illustrated. As with FIG. 4 above, encrypted data 114 can reside on a host server (e.g., server 502), however; in this example, server 502 can have the ability to access and/or decrypt information associated with user 104. In particular, server 502 can maintain or manage decryption keys 118, and thus inherently has the capability (whether utilized or not) to decrypt encrypted data 114. Although not expressly required, in this case key generation component 110 can be included in or operatively coupled to server 502. Hence, server 502 can construct decryption keys 118 from information 106 provided by user 104, which was substantially described in connection with FIG. 1 (e.g., a password).

When server 502 either expressly or inherently has access to unencrypted data, it can be possibly to implement more sophisticated access policies for disparate entity 302 relating to not only who can access what data, but also to search procedures. For example, server 502 can generate various hierarchical keys 118, 120 as well as searching trapdoors for a disparate entity such that searching can be performed by server 502 without decrypting and/or to provide only encrypted data 114 to an authorized disparate entity 302 in the case where the data is not transmitted over a secure line or to supplement security even over secure connections. Appreciably these keys 118, 120 or trapdoors can be provided to disparate entity 302 by way of package 304 once disparate entity 302 provides adequate credentials to server 502.

In addition, preferences 306 associated with user 104 can be employed to tailor the sharing of encrypted data 114 with disparate entity 302 as was detailed supra. However, in addition to removing certain personal information as was described above (e.g., name or address or the like), server 502 can facilitate the introduction of noise to certain information (e.g., by way of an epsilon function) or provide information in ranges rather than exact values. For example, user 104 might indicate via preferences 306 that she does not want her age to be reported to a first particular disparate entity 302 (who is authorized to access or search her data), but that it is acceptable for a second disparate entity 302 to view the fact that she is, say, between 30-40 to help with their research. Similarly, another example setting or preference 306 is that particular information associated with user 104 will only be shared if a threshold number of other users (or other users for whom disparate entity 302 is authorized to access) have the same characteristics as user 104. Thus, user 104 can have an additional statistical guarantee of anonymity beyond removing identifying information such as names or addresses.

When implementing server 502 for the case where server 502 has access to decryption keys 118, it should be appreciated that keys 118 can still be configured in accordance with PEKS or symmetric key protocols such that server 502 need not decrypt to provide search results. Yet, in the case discussed above, disparate entity 302 can provide credentials and then receive package 304 to facilitate access to encrypted data 114. Additionally or alternatively, however, disparate entity 302 can submit a search or query 402, which can be evaluated by server 502 before determining whether or not to provide the results to disparate entity 302 (potentially in connection with preferences 306). Appreciably, in the latter case, more flexible security protocols can be implemented.

Figure 6:
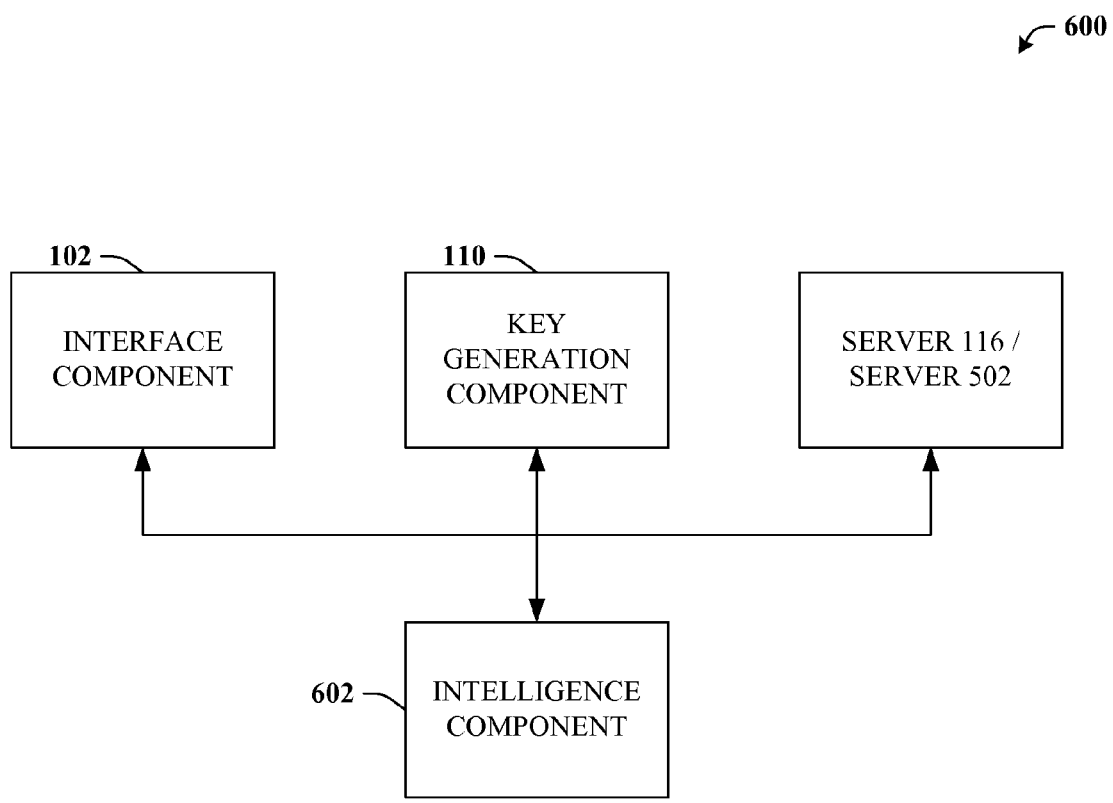
FIG. 6 is a block diagram of a system that can provide for or aid with various inferences or intelligent determinations.

Turning now to FIG. 6, system 600 that can provide for or aid with various inferences or intelligent determinations is depicted. Generally, system 600 can include interface component 102, key generation component 110, or server 116, 502 as substantially described herein. In addition to what has been described, the above-mentioned components can make intelligent determinations or inferences. For example, interface component 102 can intelligently monitor or otherwise enforce a policy that prevents a host of encrypted data 114 (e.g., server 116) from obtaining or receiving access to decryption keys. Likewise, key generation component 110 can, inter alia, intelligently determine or infer when to update an index (e.g., in connection with symmetric keys). Appreciably, any of the foregoing or other inferences can potentially be based upon, e.g., Bayesian probabilities or confidence measures or based upon machine learning techniques related to historical analysis, feedback, and/or previous other determinations or inferences.

In addition, system 600 can also include intelligence component 602 that can provide for or aid in various inferences or determinations. In particular, in accordance with or in addition to what has been described supra with respect to intelligent determination or inferences provided by various components described herein. For example, all or portions of interface component 102, key generation component 110, servers 116, 502 (as well as other components described herein) can be operatively coupled to intelligence component 602. Additionally or alternatively, all or portions of intelligence component 602 can be included in one or more components described herein. Moreover, intelligence component 602 will typically have access to all or portions of data sets described herein or otherwise suitable.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Inference may be useful for entailing the logical or probabilistic implications of the sharing or withholding of data. For example, inferential processes can assist users with the identification of unforeseen, opaque, or incomprehensible implications of sharing or withholding data with regard to the revelation of data about sensitive personal details or with the influence of withholding access on the quality of their care or with the quality of research in a health setting.

FIGS. 7, 8, 9, and 10 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
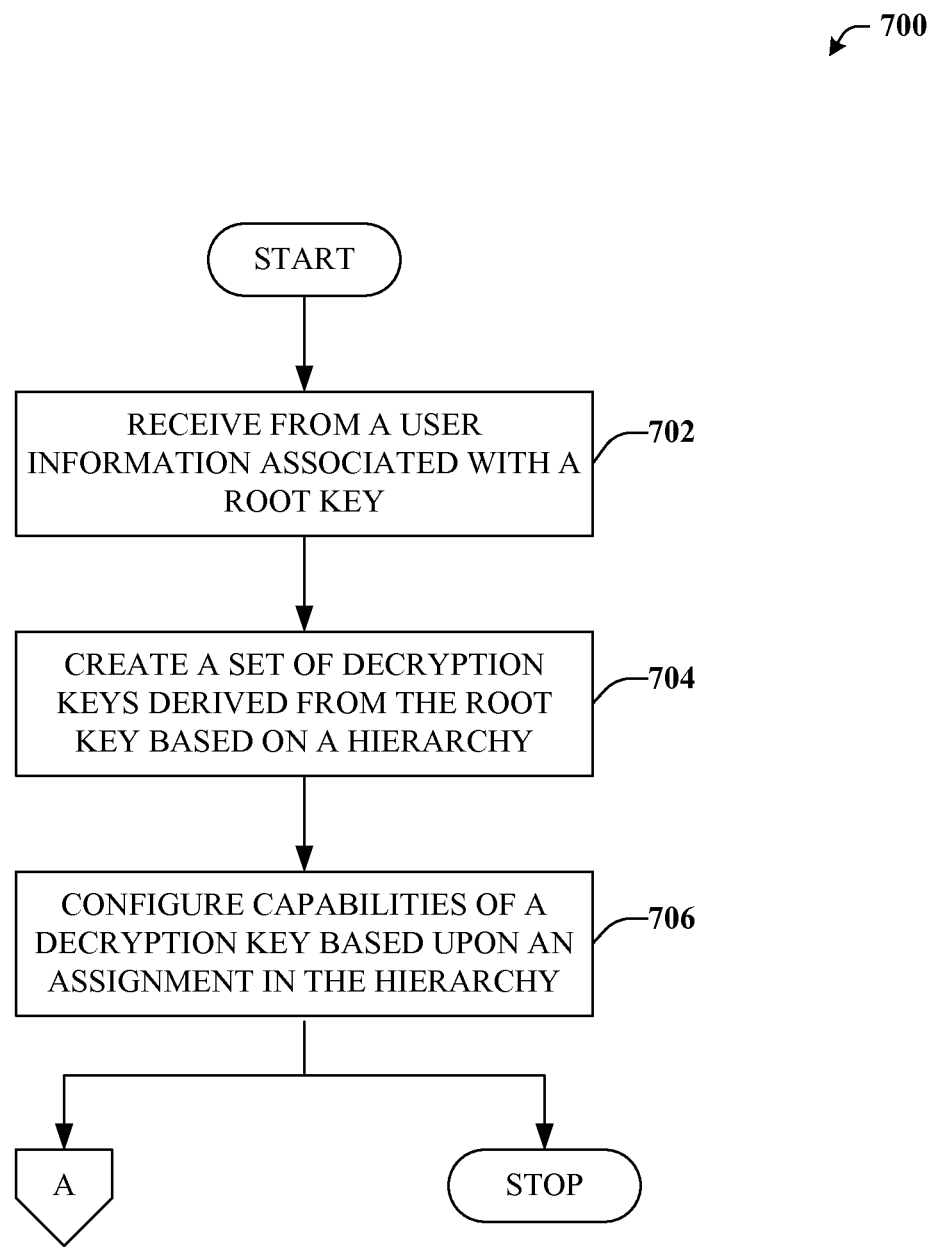
FIG. 7 depicts an exemplary flow chart of procedures that define a method for constructing a hierarchical set of decryption keys for facilitating privacy-centric data storage with diverse accessibility.

With reference now to FIG. 7, exemplary computer implemented method 700 for constructing a hierarchical set of decryption keys for facilitating privacy-centric data storage with diverse accessibility is provided. Generally, at reference numeral 702, information associated with a root key can be received from a user. The information can include the root key or can include data necessary for constructing the root key such as, e.g., a secret password of the user.

Furthermore, at reference numeral 704, a processor as well as other computer-based components and/or structures or architectures can be employed for creating a set of cryptographic decryption keys, which can be derived from the root key. When creating the set of cryptographic decryption keys, each key included in the set can conform to a hierarchy that defines or describes encrypted data associated with the user.

Next to be described, at reference numeral 706, decryption capabilities for a decryption key included in the set can be configured based upon a location or assignment of the decryption key within the hierarchy. For example, depending on the location or assignment within the hierarchy, a first decryption key can have a hierarchical relationship with a second decryption key. In that case, the first decryption key can be configured to decrypt a unique portion of data relative to the child key. Accordingly, when distributing access privileges to third parties or entities, the user can control in a hierarchical manner which data those third parties or entities can access or search.

Figure 8:
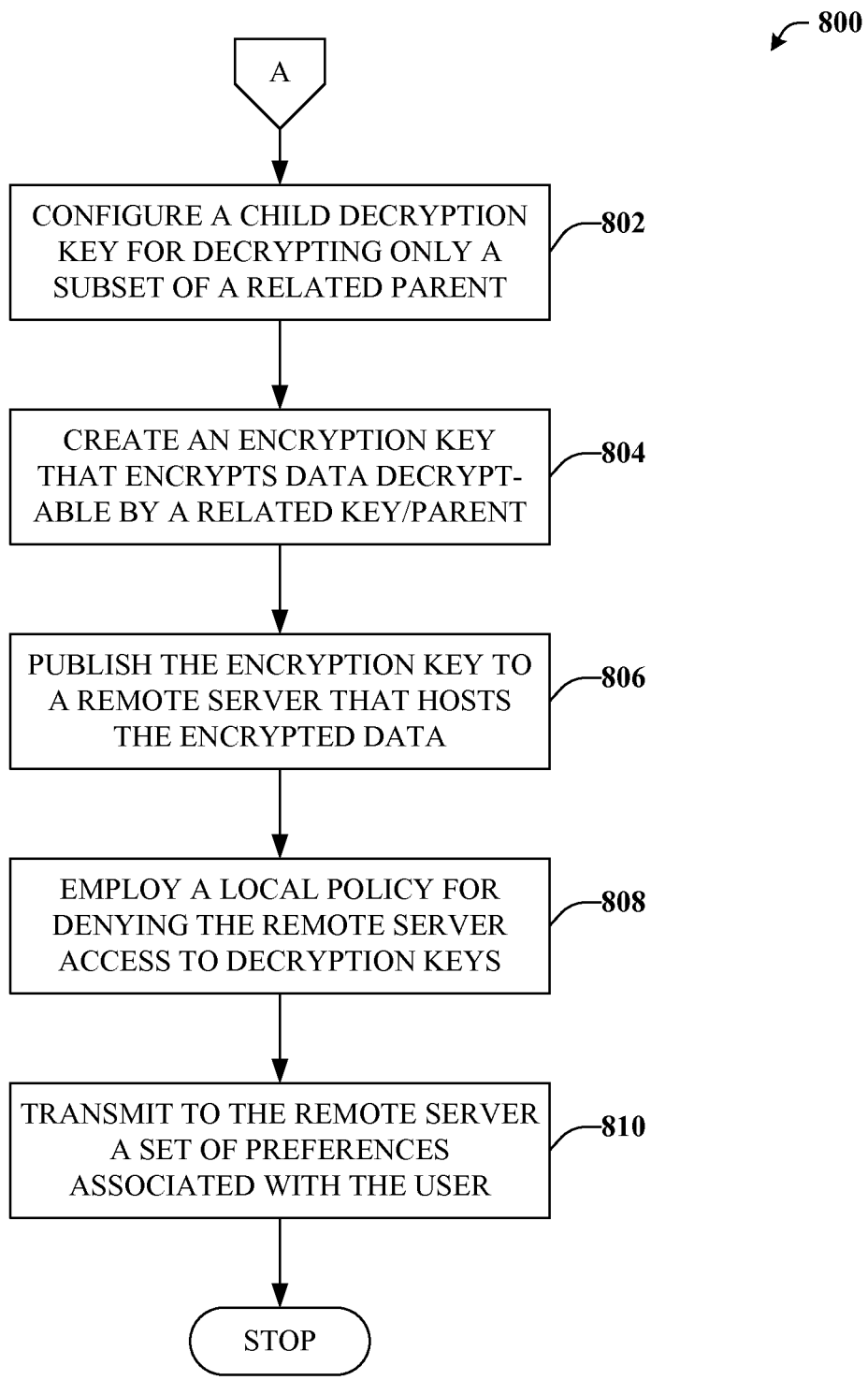
FIG. 8 illustrates an exemplary flow chart of procedures that define a method for providing addition features in connection with constructing a hierarchical set of decryption keys for facilitating privacy-centric data storage with diverse accessibility.

Referring to FIG. 8, exemplary computer implemented method 800 for providing addition features in connection with constructing a hierarchical set of decryption keys for facilitating privacy-centric data storage with diverse accessibility is depicted. At reference numeral 802, a child decryption key can be configured in accordance with reference numeral 706 of FIG. 7. In particular, the child decryption key can be a child of an associated parent decryption key in the hierarchy. As such, the child decryption key can be configured for decrypting only a subset of a portion of the encrypted data that is decryptable by the parent decryption key. Likewise, the parent can decrypt a superset of a portion of encrypted data that is decryptable by the child decryption key.

Moreover, at reference numeral 804, an encryption key for encrypting data associated with the user can be created in a manner that is decryptable by the decryption key or a hierarchical parent thereof. As with the one or more decryption keys, associated encryption keys created or configured at reference numeral 804 can be based upon or derived from the root key.

In addition, at reference numeral 806, the encryption key can be published for public access. Typically, the encryption key will be published to a remote server that hosts the encrypted data, but other means of distribution are also contemplated. Accordingly, third parties or entities can retrieve the encryption key to encrypt data associated the user and transmit the encrypted data to the remote server that hosts the encrypted data in order to update or add to records associated with the user.

At reference numeral 808, a local policy for denying the remote server access to all or portions of the set of cryptographic decryption keys can be employed. For instance, the local policy can be executed by the processor discussed in connection with reference numeral 704, which can be implemented in a computing device of the user. By preventing the remote server from obtaining any decryption keys, it can be ensured that even the remote server that hosts the user's encrypted data cannot decrypt or otherwise access unencrypted data.

Furthermore, at reference numeral 810, a set of preferences can be transmitted to the remote server, typically by the user. These preferences can include information associated with disparate entities that can obtain the encryption key (when provided to or published to the remote server), disparate entities that are afforded search privileges on the encrypted data hosted on the remote server, policies that relate to how data is revealed to one or more disparate entities, a deterministic ciphertext of data that can be revealed to disparate entity or a ciphertext of data that is not to be revealed to a disparate entity and so forth. For example, in the case that the user desires to prevent certain plaintext from being revealed (to one, several, or all disparate entities) such as the user's name, then the user can encrypt the plaintext with the encryption key and submit the resultant ciphertext to the remote server with instructions not to propagate any data with a matching or related ciphertext. In the reverse situation, if the user authorizes the disparate entity to access his or her data, but only very specific data that can be decrypted by an associated decryption key, that data can be encrypted and the ciphertext again submitted to the remote server with suitable instructions indication only matching encrypted data can be revealed.

Figure 9:
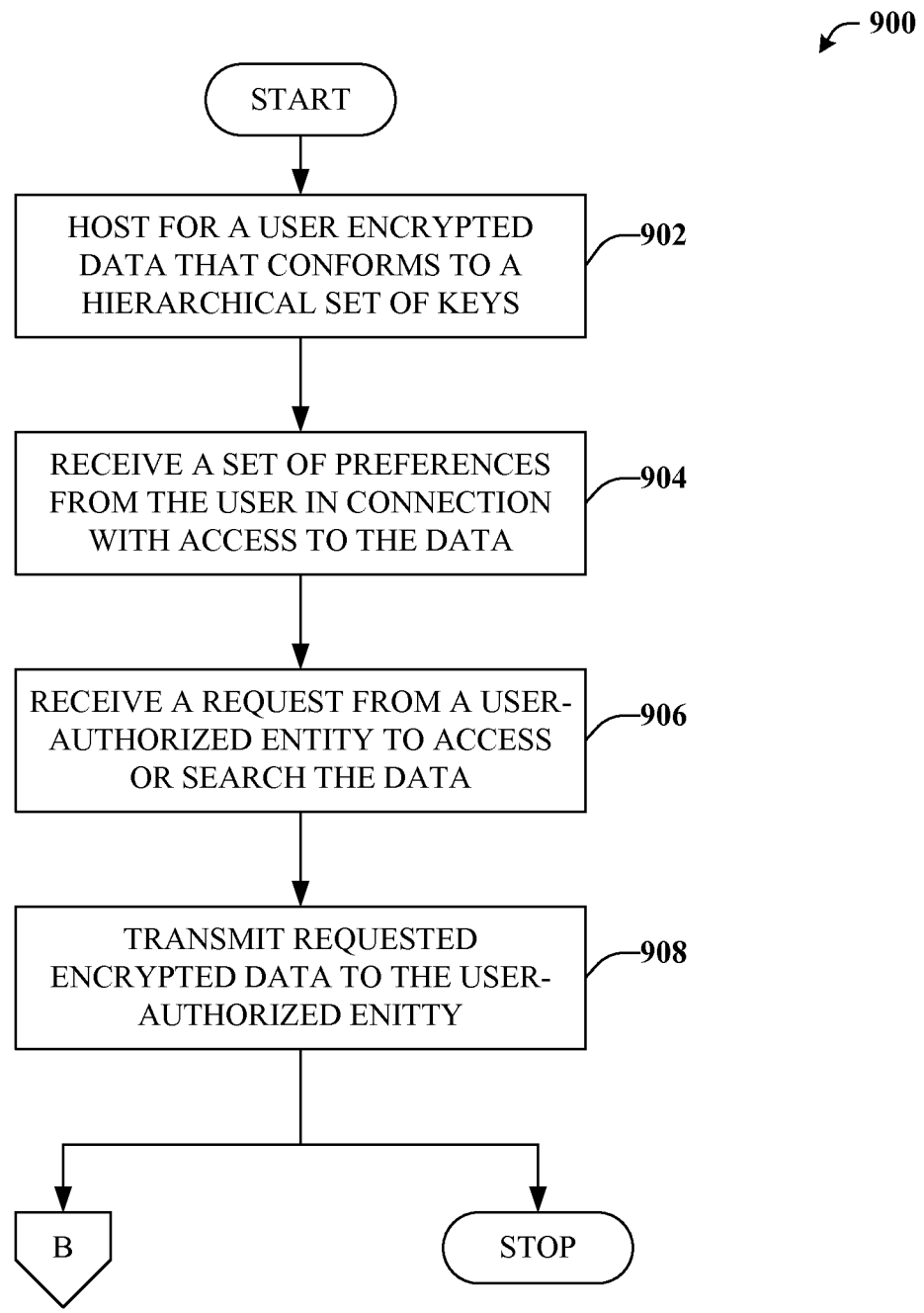
FIG. 9 depicts an exemplary flow chart of procedures defining a method for employing for securely hosting encrypted data associated with a user in a manner that facilitates user control and diverse accessibility.

With reference now to FIG. 9, method 900 for employing for securely hosting encrypted data associated with a user in a manner that facilitates user control and diverse accessibility is illustrated. At reference numeral 902, a server with a processor and a data store can be employed for hosting encrypted data associated with a user. The encrypted data can be allocated to the data store, which can be accessible by way of a network that is configured to be substantially publicly addressable. Furthermore, the encrypted data hosted by the server can conform to a hierarchical scheme such that a portion of the encrypted data decryptable by a decryption key that is associated with the user is based upon an assignment of that decryption key within a hierarchy of a set of decryption keys derived from a root key associated with the user.

At reference numeral 904, a set of preferences can be received from the user relating at least to disparate entities authorized to obtain or access the encrypted data or policies for how data is revealed to one or more entities. Likewise, at reference numeral 906, a request from a user-authorized disparate entity can be received. The request can be a request to access or search the encrypted data. In accordance therewith, at reference numeral 908, the requested encrypted data can be transmitted to the user-authorized disparate entity based upon the preferences. For instance, the preferences can change how the request is processed or even the amount or type of encrypted data that is provided to the disparate entity.

Figure 10:
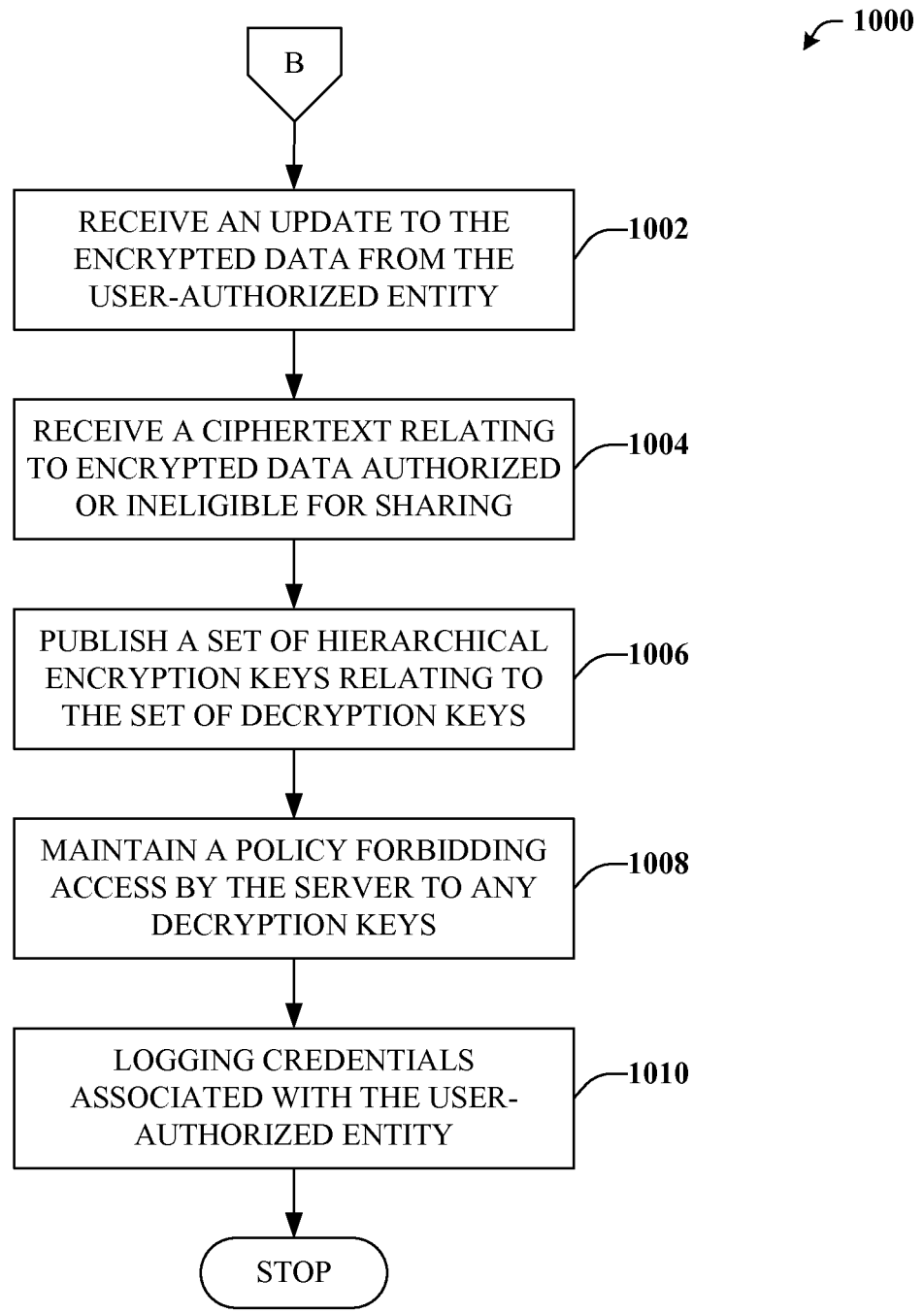
FIG. 10 is an exemplary flow chart of procedures defining a method for employing for providing additional features in connection with securely hosting encrypted data associated with a user in a manner that facilitates user control and diverse accessibility.

Turning now to FIG. 10, method 1000 for employing for providing additional features in connection with securely hosting encrypted data associated with a user in a manner that facilitates user control and diverse accessibility is depicted. At reference numeral 1002, an update to the encrypted data associated with the user can be received by the server from a user-authorized disparate entity. Generally, the update will be encrypted with a suitable encryption key provided to the disparate entity by the user or the server.

At reference numeral 1004, a ciphertext corresponding to encrypted data that is either authorized for sharing or ineligible for share with all or a subset of user-authorized disparate entities can be received. The ciphertext can be received along with or as part of the set of preferences discussed in connection with reference numeral 904. Regardless, this ciphertext can be employed by the server to ensure that only matching encrypted data can be obtained by all or a subset of authorized disparate entities or, depending on the instructions from the user that matching encrypted data cannot be obtained by all or a subset of authorized disparate entities.

Additionally, at reference numeral 1006, a set of hierarchical encryption keys relating to corresponding decryption keys can be published on the server for retrieval by the user-authorized disparate entities. Appreciably, these encryption keys can conform to the very same hierarchy as that of the associated decryption keys and can also be derived from the root key.

At reference numeral 1008, a policy forbidding access by the server to any decryption key included in the set of decryption keys detailed with reference to reference numeral 902 can be maintained by the server. In other words, policy can forbid the server from attempting to acquire decryption keys and even actively prevent or delete known decryption keys that exist on or are transmitted to the server.

At reference numeral 1010, certain credentials, typically but not necessarily cryptographic credentials associated with the user-authorized disparate entity can be logged when encrypted data is accessed, searched, or updated. In the case of an access or search, the transaction can be stored to a log. In the case of an update, the credentials can be embedded with the encrypted data to identify the source of the update to encrypted data associated with the user.

Figure 11:
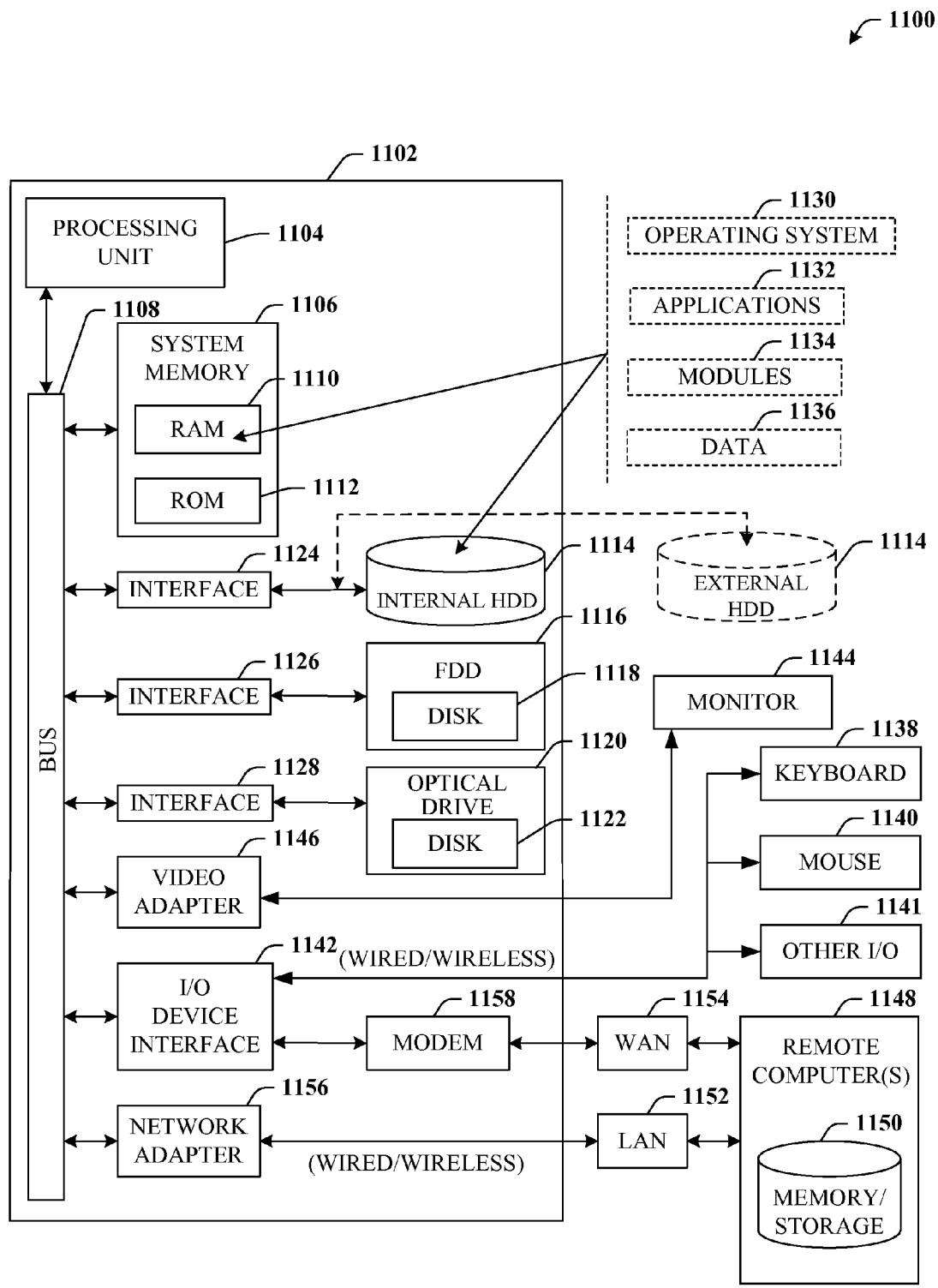
FIG. 11 illustrates a block diagram of a computer operable to execute or implements all or portions of the disclosed architecture.

Referring now to FIG. 11, there is illustrated a block diagram of an exemplary computer system operable to execute the disclosed architecture. In order to provide additional context for various aspects of the claimed subject matter, FIG. 11 and the following discussion are intended to provide a brief, general description of a suitable computing environment 1100 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the claimed subject matter includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices 1141 may include a speaker, a microphone, a camera or another imaging device, an IR remote control, a joystick, a game pad, a stylus pen, touch screen, or the like. These and other input devices are often connected to the processing unit 1104 through an input-output device interface 1142 that can be coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, a mobile device, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 12:
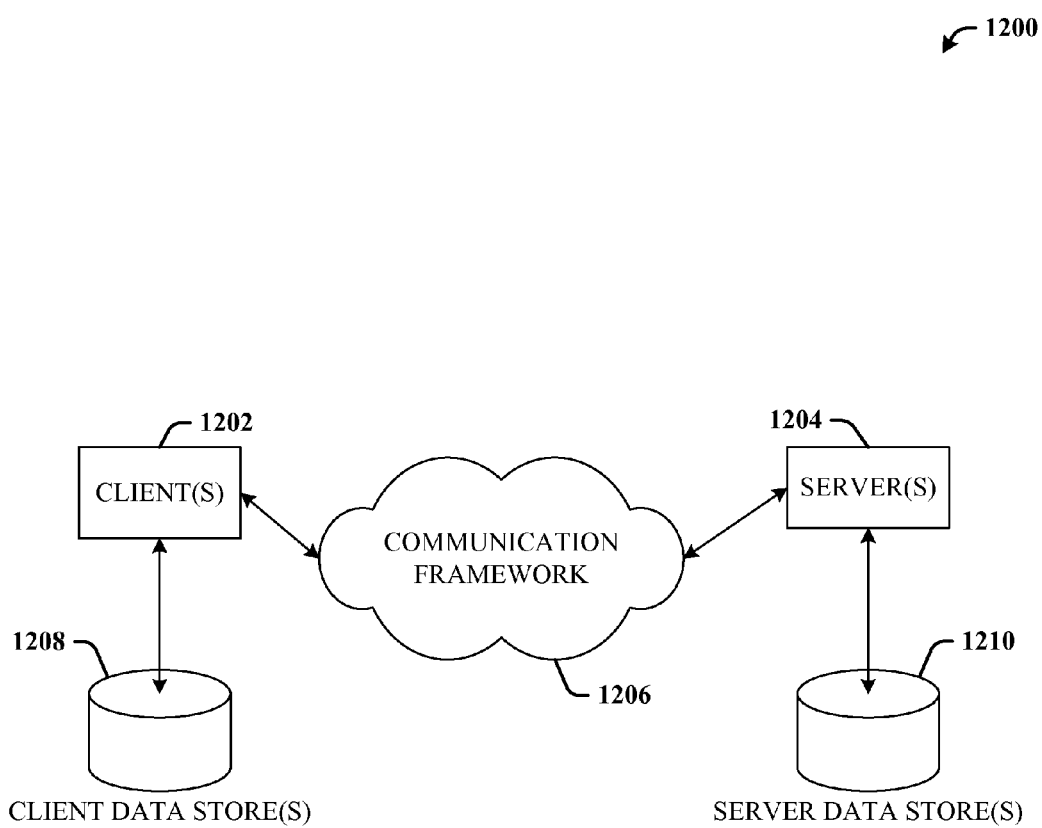
FIG. 12 illustrates a schematic block diagram of an exemplary computing environment.

Referring now to FIG. 12, there is illustrated a schematic block diagram of an exemplary computer compilation system operable to execute the disclosed architecture. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that creates a hierarchical set of decryption keys to facilitate privacy-centric data storage of health records with diverse accessibility, comprising:
   an interface component that obtains from a user or an associated device information associated with a root key, in which the information includes a policy the user controls to maintain granular control over accessing the health records of the user by authorized accessing parties such that the policy specifies different keys to capture different preferences about sharing of the health records, wherein a first key is associated with sharing a set of the health records of the user with a first party and is further associated with a first user preference for data access, and a second key is associated with sharing a subset of the set of the health records of the user with a second party and is further associated with a second user preference for data access different than the first user preference for data access; and
   a key generation component that employs the root key to derive a private set of cryptographic decryption keys that conforms to a hierarchy that describes partitioning of the encrypted data of the user based at least in part upon features or content of the encrypted data, wherein decryption capabilities of a decryption key from the private set of cryptographic decryption keys is defined based at least in part upon a location or an arrangement of the decryption key within the hierarchy.

2. The system of claim 1, the information is at least one of a password or biometric data;
   the policy specifies that data associated with the user is shareable unless the data indicates at least a specified rise in risk over an average amount of risk of a disorder for a cohort population associated with the user; and
   the key generation component constructs the root key based upon the information, or the information includes the root key.

3. The system of claim 1, the policy that defines a pattern of access associated with the hierarchy or one or more decryption keys included in the private set; and the key generation component further employs the policy to derive at least one decryption key included in the private set.

4. The system of claim 3, the policy relates to at least one of a statement regarding the at least one decryption key or an associated encryption key; or to an assertion of rules, constraints, or inferences in connection with the at least one decryption key or an associated encryption key; and the pattern of access relates to at least one of one-time access, access limited by a count, access limited by a time period, access limited based upon contextual situation, access limited based upon a type of data or a level of detail or precision for the data, access limited based upon identity, or unlimited access.

5. The system of claim 3, the policy is encrypted and the information includes a policy decryption key and an encrypted layer of the hierarchy; the key generation component employs the policy decryption key to decrypt the policy and further to reveal an additional layer of the hierarchy or an additional policy key.

6. The system of claim 1, the key generation component employs the hierarchy to characterize or derive a first decryption key as a parent and a second decryption key as a child of the parent.

7. The system of claim 6, the key generation component configures the parent to decrypt a first set of encrypted data associated with the user, and further configures the child to decrypt a second set of encrypted data associated with the user, wherein the second set of encrypted data is a subset of the first set of encrypted data; and the interface component transmits the parent to a first disparate entity and transmits the child to a second disparate entity according to authorization or preferences associated with the user such that the second disparate entity is able to decrypt only a portion of the data decryptable by the first disparate entity.

8. The system of claim 1, the key generation component further constructs an encryption key that is configured to encrypt data associated with the user in a manner that is decryptable by at least one decryption key included in the private set of cryptographic decryption keys.

9. The system of claim 8, the encryption key is configured to encrypt data associated with the user according to the hierarchy such that only a corresponding decryption key or a parent thereof can decrypt associated encrypted data.

10. The system of claim 8, the encryption key is one of a set of public cryptographic encryption keys, wherein each public encryption key included in the set of public cryptographic encryption keys corresponds to a respective decryption key included in the private set of cryptographic decryption keys.

11. The system of claim 8, the encryption key is at least one of an identity-based encryption key that employs an identity parameter when encrypting data associated with the user, or a symmetric key that is related to one or more decryption keys included in the private set of cryptographic decryption keys.

12. The system of claim 11, the identity parameter is a category, a classification, or a keyword included in or described by the hierarchy.

13. The system of claim 11, the encryption key conforms to at least one of: randomized encryption to facilitate a higher level of security in connection with storage of encrypted data or deterministic encryption to facilitate more efficient queries in connection with storage of encrypted data.

14. The system of claim 6, the interface component transmits the encryption key to a remote server that stores data associated with the user that is encrypted by the encryption key, the interface component further does not provide the remote server with access to any decryption key included in the private set of cryptographic decryption keys.

15. The system of claim 1, the interface component transmits a set of preferences to a server that hosts encrypted data associated with the user, the set of preferences define at least one of disparate entities that can obtain the encryption key, disparate entities that can search the encrypted data, policies that relate to how data is revealed to one or more disparate entities, or a ciphertext of data that is not to be revealed.

16. The system of claim 1, the interface component transmits a package to a disparate entity based upon authorization from or preferences associated with the user in order to facilitate decryption or search capabilities in connection with encrypted user data by the disparate entity, the package includes at least one of (1) one or more decryption key from the private set of cryptographic decryption keys, (2) one or more encryption keys, or (3) a searching trapdoor for one or more keywords.

17. A computer implemented method for constructing a hierarchical set of decryption keys for facilitating privacy-centric data storage with diverse accessibility, comprising:

receiving from a user information associated with a root key, in which the information includes a policy the user controls to maintain granular control over accessing encrypted data of the user by authorized accessing parties such that the policy specifies a set of keys to capture preferences about sharing of personal information of the user with the parties, wherein a first key is associated with sharing a set of the personal information of the user with a first party and is further associated with a first user preference for a first level of detail of data access, and a second key is associated with sharing a subset of the set of the personal information of the user with a second party and is further associated with a second user preference for a second level of detail of data access different than the first user preference for the first level of detail of data access;

employing a processor to create a set of cryptographic decryption keys derived from the root key, in which a decryption key included in the set of cryptographic decryption keys conforms to a hierarchy describing or defining encrypted data associated with the user; and configuring decryption capabilities for the decryption key included in the set of cryptographic decryption keys based at least in part upon a location or assignment of the decryption key within the hierarchy.

18. The method of claim 17, further comprising at least one of the following acts:

configuring a child decryption key for decrypting only a subset of a portion of the encrypted data that is decryptable by a parent of the child decryption key;

creating an encryption key for encrypting data associated with the user in a manner that is decryptable by the decryption key or a parent thereof;

publishing for public access the encryption key to a remote server that hosts the encrypted data;

employing a local policy for denying the remote server access to all or portions of the set of cryptographic decryption keys transmitting the decryption key to at least one disparate entity in a secure manner; or transmitting to the remote server a set of preferences describing at least one of disparate entities that can obtain the encryption key, disparate entities that can search the encrypted data, policies that relate to how data is revealed to one or more disparate entities, or a ciphertext of data that is to be revealed or is not to be revealed.

19. A computer implemented method for securely hosting encrypted data associated with a user in a manner that facilitates user control and diverse accessibility, comprising:

employing a server with a processor and a data store for hosting encrypted data associated with a user in the data store that is accessible by way of a network that is configured to be substantially publicly addressable, wherein the encrypted data conforms to a hierarchical scheme such that a portion of the encrypted data decryptable by a decryption key associated with the user is based at least in part upon a location or an assignment of the decryption key within a hierarchy of a set of decryption keys derived from a root key associated with the user;

receiving a set of preferences from the user relating to at least entities authorized to obtain, access, or search the encrypted data or policies for how data is revealed to one or more entities, in which the set of preferences specifies a set of keys for the user to maintain granular control over sharing of personal information of the user with the one or more entities, wherein a first key of the set of keys is associated with sharing a set of the data associated with the user with a first entity and is further associated with a first preference of the set of preferences for sharing data, and a second key of the set of keys is associated with sharing a subset of the data associated with the user with a second entity and is further associated with a second preference of the set of preferences for sharing data different than the first preference of the set of preferences for sharing data;

receiving a request from a user-authorized entity to access or search the encrypted data; and transmitting requested encrypted data to the user-authorized entity based at least in part upon the preferences.

20. The method of claim 19, further comprising at least one of the following acts:

receiving an update to the encrypted data associated with the user from a user-authorized entity;

receiving a set of preferences relating to a ciphertext corresponding to encrypted data that is either authorized for sharing or ineligible for sharing with all or a subset of user-authorized entities;

publishing for retrieval by user-authorized entities a set of hierarchical encryption keys relating to the set of decryption keys;

maintaining on the server a policy forbidding access by the server to any decryption key included in the set of decryption keys; or logging credentials associated with the user-authorized entity when encrypted data is accessed, searched, or updated.

* * * * *